US006866059B2

(12) United States Patent
Griffin

(10) Patent No.: US 6,866,059 B2
(45) Date of Patent: *Mar. 15, 2005

(54) RECONFIGURABLE CLEAN-IN-PLACE AIR-BLOW VALVE

(76) Inventor: William R. Griffin, 23515-112th St., Trevor, WI (US) 53179

( * ) Notice: Subject to any disclaimer, the term of this patent is extended or adjusted under 35 U.S.C. 154(b) by 0 days.

This patent is subject to a terminal disclaimer.

(21) Appl. No.: 10/464,377

(22) Filed: Jun. 18, 2003

(65) Prior Publication Data

US 2003/0213519 A1 Nov. 20, 2003

Related U.S. Application Data

(63) Continuation-in-part of application No. 09/725,279, filed on Nov. 29, 2000, now Pat. No. 6,601,603.

(51) Int. Cl.[7] ............................................. F16K 51/00
(52) U.S. Cl. ....................... 137/240; 137/271; 137/550; 251/63.5
(58) Field of Search ................................ 137/240, 271, 137/550; 251/63.5

(56) References Cited

U.S. PATENT DOCUMENTS

| | | | |
|---|---|---|---|
| 2,458,230 A | | 1/1949 | Warcup |
| 3,052,444 A | * | 9/1962 | Kintner ...................... 251/63.6 |
| 3,290,003 A | * | 12/1966 | Kessler ...................... 251/63.6 |
| 3,334,648 A | * | 8/1967 | Probst ......................... 137/240 |
| 3,572,366 A | | 3/1971 | Wiggins |
| 3,709,247 A | * | 1/1973 | Roth et al. ................... 137/271 |
| 4,836,420 A | | 6/1989 | Kromrey |
| 5,343,907 A | | 9/1994 | Wagner |
| 5,390,694 A | | 2/1995 | Zimmerly et al. |
| 5,415,192 A | | 5/1995 | Pera |
| 5,564,457 A | | 10/1996 | Beck |
| 5,692,540 A | * | 12/1997 | Huang ........................ 251/63.6 |
| 5,850,845 A | | 12/1998 | Pereira et al. |
| 6,601,603 B2 | * | 8/2003 | Griffin ......................... 137/240 |

* cited by examiner

Primary Examiner—Gerald A. Michalsky
(74) Attorney, Agent, or Firm—Patterson, Thuente, Skaar & Christensen, P.A.

(57) ABSTRACT

An air-blow valve configured for clean-in-place capability is provided. The valve comprises a valve body defining a valve seat and internal fluid passageways. The valve further comprises valve components disposed within the valve body, including a plug, a piston, and a spring. The valve is separately operatively connected to a pressurized-air source and to a sanitizing-fluid source. In operation, the spring biases the piston, causing the plug to engage the seat, to prevent undesired fluid flow between the passageways and the connecting conduits. Alternatively, the spring biases the piston, causing the plug to disengage the seat, allowing fluid flow between the passageways and connecting conduits. Pressurized air is used to space the plug from the seat to achieve flow whenever desired, or alternatively to engage the seat to prevent fluid flow when desired. Periodic selective movement of the piston to space the plug from the seat, enables the cleaning solution to pass through the body and clean the internal passageways, the seat, and the plug, thereby rendering unnecessary disassembly of the valve and/or removal of the valve from the connecting conduits during valve cleaning.

19 Claims, 13 Drawing Sheets

RECONFIGURABLE CLEAN-IN-PLACE AIR-BLOW VALVE

CLAIM TO PRIORITY

The present patent application is a Continuation-In-Part of U.S. patent application Ser. No. 09/725,279, filed Nov. 29, 2000 now U.S. Pat. No. 6,601,603, titled "Clean-in-Place Air-Blow Valve". The above referenced patent application is hereby claimed as a priority document and is hereby incorporated by reference herein.

TECHNICAL FIELD OF THE INVENTION

The present invention is directed to an air-blow valve designed for clean-in-place capability that is reconfigurable to act in a drainage valve capacity and operatively connected to a sanitizing-fluid source, to render the air-blow valve sanitary. The present invention is also directed to a sanitary clean-in-place air-blow valve that is designed to be used in connection with conventional fluid-transport systems.

BACKGROUND OF THE INVENTION

The use of an air-blow valve in conventional fluid-treatment and fluid-processing facilities is well known in the art. Such air-blow valves may sometimes be referred to as "air-blow check-valve assemblies" that serve to allow pressurized air to be injected into a fluid conduit, wherein the pressurized air is used to cause the injected fluid to move from the point of injection to an opening in the conduit spaced from the fluid-injection point. When used thusly, air-blow valves may be operatively connected to a vast assortment of conventional fluid-transport or solids-transport systems to recover, e.g., food products from a supply line, for conveying the recovered products to suitable storage facilities.

For example, U.S. Pat. No. 2,458,230 to Warcup is directed to the field of a cleaning means for beer dispensers. In particular, Warcup discloses a valve having four internal chambers, wherein the valve is designed to allow water to enter the first chamber and pass to the second chamber, which is connected to a beer line. The Warcup valve is further designed to allow beer to pass to the beer line via the second and third chambers. In the Warcup valve, air is able to pass into the fourth chamber, to enable a rod to engage and move a valve element, thereby to permit fluid communication between the first and second chambers. The Warcup design does not permit water to enter the third chamber.

In U.S. Pat. No. 3,572,366 to Wiggins, a valve for supplying paint is disclosed. Also disclosed is an embodiment wherein several Wiggins valves are joined to a housing to form a multi-color spray-painting assembly. The assembly is adapted to be operatively connected to a pressurized supply of solvent and, separately, to paint. In that regard, the assembly is adapted to be separately connected to several different-colored paints.

One feature of each Wiggins valve permits automatically purging certain internal chambers of the assembled valves when the paint supply to an individual valve is cut off.

U.S. Pat. No. 4,836,420 to Kromrey discloses a clean-in-place valve-actuating device that is used to facilitate the cleaning of a machine for providing soft ice cream and milkshakes. The Kromrey valve-actuating device permits the cleaning-in-place of such a machine, eliminating the need to dismantle the machine for manual cleaning thereof.

U.S. Pat. No. 5,343,907 to Wagner is directed to a device used for cleaning carbonated beverage-dispensing systems. The essence of the Wagner device is a rather complex valve having a number of interrelated fluid passageways or internal chambers.

For example, in the Wagner patent, water or a cleaning agent may be introduced either into a first or into a second chamber of the valve. A piston, longitudinally disposed in the first valve chamber, has a third chamber formed therein. The piston, moreover, is especially designed to enable the first and second chambers to be in fluid communication via the third chamber. A fourth chamber of the valve is in fluid communication, via a flow-check valve, with a beverage source. Pressurized carbon dioxide is used to move the beverage from its source, via the flow-check valve, into the fourth chamber. A fifth chamber of the valve is in fluid communication with a line for dispensing the beverage to a consumer. A sixth chamber of the Wagner valve is in fluid communication, directly, with the beverage source. The flow-check valve is designed to permit fluid flow from the sixth chamber into the fourth chamber, but not vice versa. The fifth chamber of the valve is in direct fluid communication with the first four of the above-mentioned chambers.

In U.S. Pat. No. 5,390,694 to Zimmerly, et al., a bottom-fill clean-in-place (CIP) system is disclosed. Illustrated in the patent are a number of Zimmerly, et al. valves, at least as complex as the Wagner valve, wherein the Zimmerly, et al: valves are operatively connected to plural pipelines for separately providing raw materials and/or CIP solution to the bottom portion of a row of tanks and for withdrawing liquid product such as milk therefrom.

U.S. Pat. No. 5,415,192 to Pera shows a cleaning device for a milk plant. To achieve cleaning of pipelines, disassembly and re-assembly of the pipelines is required.

U.S. Pat. No. 5,564,457 to Beck is directed to a so-called "vacuum breaker" valve said to have CIP capability. The essence of the Beck valve is yet another rather complex valve defining a number of interrelated fluid passageways or chambers.

For example, in the Beck valve, milk is introduced into a first chamber of the valve. Air may be drawn into a second chamber of the valve. A sphere, disposed in a third chamber of the valve, is able to engage a first valve seat, thereby forming a plurality of so-called "satellite channels." The plurality of satellite channels may collectively be thought of as a fourth chamber. The third and fourth chambers, together, enable the first and second chambers to be in fluid communication. The Beck valve uses an air cylinder to cause a piston, disposed in a fifth chamber, to move. The fifth chamber is in fluid communication with the second chamber. In operation, the sphere is able to sealingly engage a second valve seat, thereby to break fluid communication between the second and third chambers; whereupon the piston, caused to move by the air cylinder, is able to re-establish fluid communication between the second and third chambers of the valve.

In U.S. Pat. No. 5,850,845 to Pereira, et al., a so-called "backflush valve" for a milking machine is disclosed. The backflush valve includes a slide pad that is captively disposed between an inlet plate and an outlet plate. The inlet plate defines a milk inlet and a cleaning-solution inlet. The slide pad defines a milk-flow path. The outlet plate defines a milk outlet. The milk-flow path provides fluid communication between the milk inlet and the milk outlet when the slide pad is in a so-called "milking" position. The slide pad further defines a cleaning-solution path, which provides fluid communication between the milk inlet and the cleaning-solution inlet, when the slide pad is in a so-called "backflush" position. Compressed air is used to cause a so-called "double acting" piston, which is disposed within the valve, to move between two spaced-apart positions.

For a number of reasons, principally ever-increasing labor costs and the mandate from management to keep production plants "on stream," there is a desire to incorporate CIP systems and "retire" procedures that require disassembly and subsequent re-assembly of production-plant component parts, whenever it is possible and economically practical.

As some of the above-discussed patents suggest, dairies and food-treatment plants use CIP systems, to maintain system cleanliness and achieve sanitary conditions. In such CIP systems, however, air-blow valves, for a number of reasons, have been unable to take advantage of being cleaned in place.

To keep valve-maintenance as well as labor and replacement-parts costs to a minimum, it would be desirable to have a valve that is relatively simple in design.

To that end, as my invention illustrates, air-blow valves can be simple in design.

It thus would be desirable to use air-blow valves, simple in design and configured for clean-in-place capability, in various production plants for an assortment of products. It would be further desirable to have such an air-blow valve design that is readily reconfigurable so as to act in a drainage valve capacity.

It would be even further desirable to have an air-blow valve, simple in design and adapted for clean-in-place capability, where the valve is also relatively simple to operate.

To that end, my valve is simple to operate. For reasons suggested above, it would therefore be particularly desirable to use, especially in dairies and food-treatment plants, the air-blow valve of this invention, which is adapted to have clean-in-place capability, and further adapted to be readily reconfigurable.

The invention thus relates to a clean-in-place air-blow valve which is both simple in construction as well as in operation, with the result that the air-blow valve is reliable.

From the analysis of the prior art patents identified above, no single reference or combination of references is able to achieve the desiderata briefly mentioned herein.

Moreover, in comparison to conventional clean-in-place valves, wherein some of the patents discussed herein are illustrative, the air-blow valve of the present invention employs methods, disclosed in detail below, that-have the effect of rendering unnecessary the removal of the present air-blow valve from any associated fluid-transport systems as well as from any fluid-treatment and/or fluid-processing facilities during valve cleaning.

Further in view of inadequacies of the prior art patents, this invention is generally directed to the field of air-blow valves, connected to conventional fluid-treatment and/or fluid-processing facilities which, in turn, are associated with such conventional material-transport systems as liquid-product transport and/or solid-product transport systems.

These and other features of the present invention, which will now be summarized, shall become apparent to those skilled in the art after reviewing this patent specification.

SUMMARY OF THE INVENTION

An air-blow valve, configured for clean-in-place capability, comprises a hollow valve body, select valve components, and at least two interchangeable conduits. The hollow valve body defines an internal chamber presenting an inner surface, an internal shoulder, an internal valve seat, and an internal fluid passageway. The select valve components, disposed in the valve body, include a piston disposed within the chamber, a spring, and a valve plug.

The piston is so adapted and dimensioned relative to the inner surface of the chamber of the valve body as to be slidably engageable in a fluid-tight manner between first and second positions along the chamber inner surface. The spring, captively retained within the valve body, abuttingly engages the piston on one of two sides depending upon whether the valve is acting in a drainage or air-blow valve capacity. The valve plug, operatively connected to the piston, is configured (i) to engage the valve seat in a fluid-tight relationship when the piston is in the first position and (ii) to permit fluid flow between the valve plug and the valve seat when the piston is in the second position.

The valve includes a first interchangeable conduit and a second interchangeable conduit, wherein at least one interchangeable conduit is in fluid communication with a pressurized-air source and operatively connected to the valve body, for providing pressurized air to the chamber for urging the piston into the second position or the first position. A third conduit, in fluid communication with a sanitizing-fluid source and operatively connected to the valve body, provides a sanitizing fluid into a portion of the valve body, for sanitizing the valve seat, the plug, and the internal fluid passageway.

Preferably, the hollow valve body (summarized above), includes at least two body portions, which define an interfit connection, wherein the intermitting body portions are detachably joined in an air-tight manner.

Also in reference to the air-blow valve (summarized above), the internal chamber is preferably elongated and cylindrical, and the internal shoulder is preferably annular.

Further in reference to the air-blow valve of the invention, the fluid passageway is preferably cylindrical, and the valve seat is preferably "quasi frusto-conical" in shape. This means that the valve seat resembles a frustum in that the valve seat, in sectional view, is seen to include the basal part of a cone-like shape formed by cutting-off the top (of the cone-like shape) via a plane parallel to the base. The valve seat is thus "quasi" frusto-conical in shape, for the reason that the valve seat, in the illustrated preferred embodiments, is configured to engage the valve plug in a fluid-tight relationship, when the piston is in the closed position and the valve plug is operatively connected to the piston.

Still further in reference to the air-blow valve of the present invention, the several valve components enumerated above are preferably characterized as further including an elongated valve stem which is disposed within the valve body. The elongated valve stem has opposite end portions. The piston is releasably affixed adjacent to one end portion of the stem, and the valve plug is mounted on the opposite end portion of the stem. Also, the spring, preferably helical, is captively retained in the valve body by the valve stem.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

Throughout the drawings, like reference numerals refer to like parts.

DETAILED DESCRIPTION OF THE PREFERRED EMBODIMENTS

Figure 1:
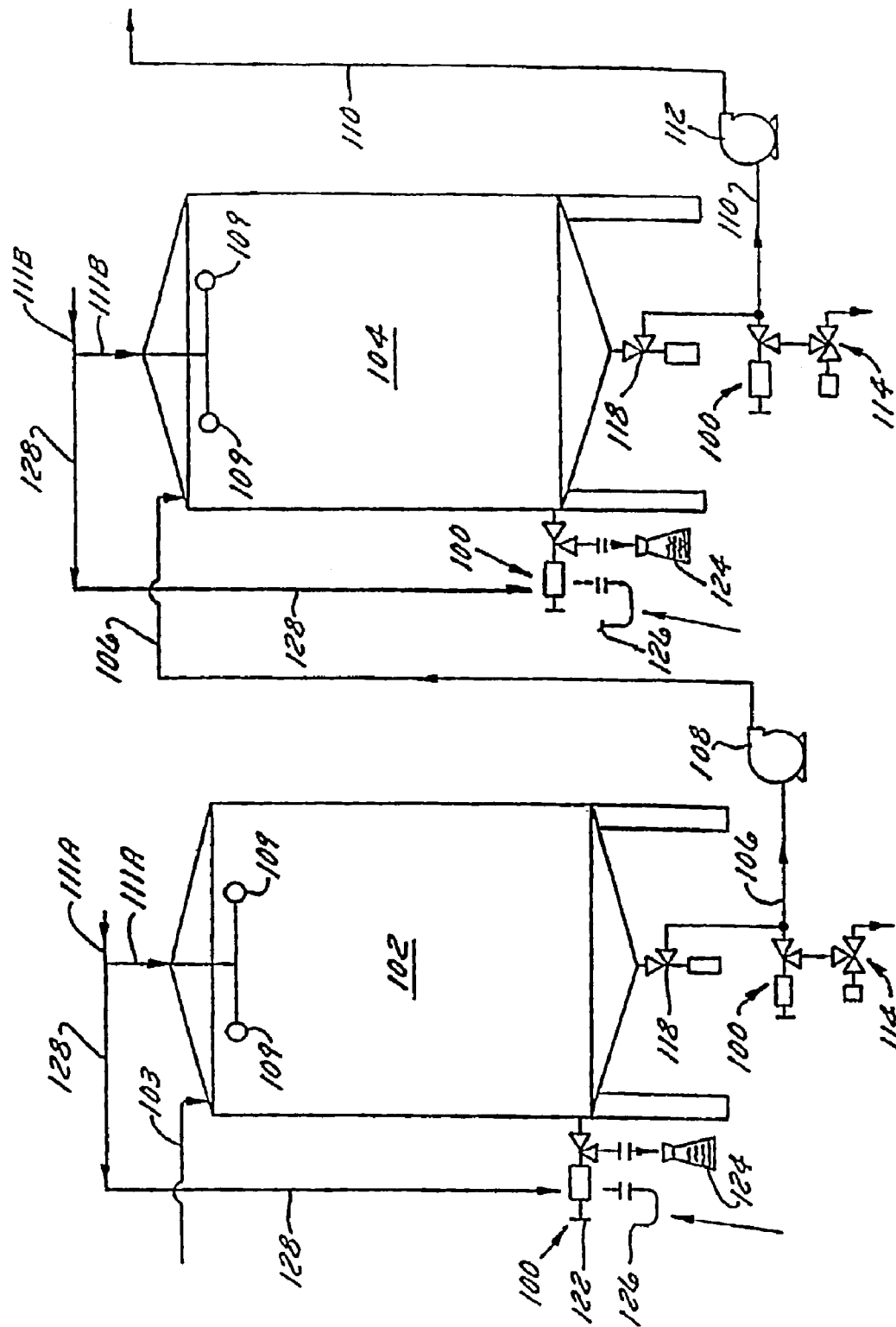
FIG. 1 is a schematic illustration of the clean-in-place air-blow valve of the present invention, shown in its preferred environment for two possible applications.

While the present invention is susceptible to embodiments in various forms, there is shown in the drawing FIGURES and hereinafter described in detail a number of presently preferred embodiments, with the understanding that this disclosure is to be considered as providing an example of the invention without limitation to the embodiments illustrated.

Referring initially to FIG. 1, there is shown an air-blow valve 100 configured for clean-in-place capability. The air-blow valve 100 of the present invention is shown in a preferred environment for two possible applications. In particular, the clean-in-place (CIP) air-blow valve 100 is shown operatively connected to first and second tanks 102 and 104 to provide the tanks 102 and 104 with the ability to sample the tank contents as well as to provide each tank 102 and 104 with clean-in-place capability.

The first tank 102 includes an inlet line 103 to allow a liquid material to be introduced into the first tank 102. Tank contents are passed from the first tank 102 to the second tank 104 via a conduit 106 and a first pump 108. The tanks 102 and 104 are provided with internal nozzles 109 configured and directed to provide a conventional clean-in-place solution from a source (not shown) to the inner surfaces of the tanks 102 and 104 via conduits 111A and 111B. From the second tank 104, the tank contents are passed by a conduit 110 and second pump 112 to another location (not shown) for storage or further processing of the tank contents, as desired.

Figure 2:
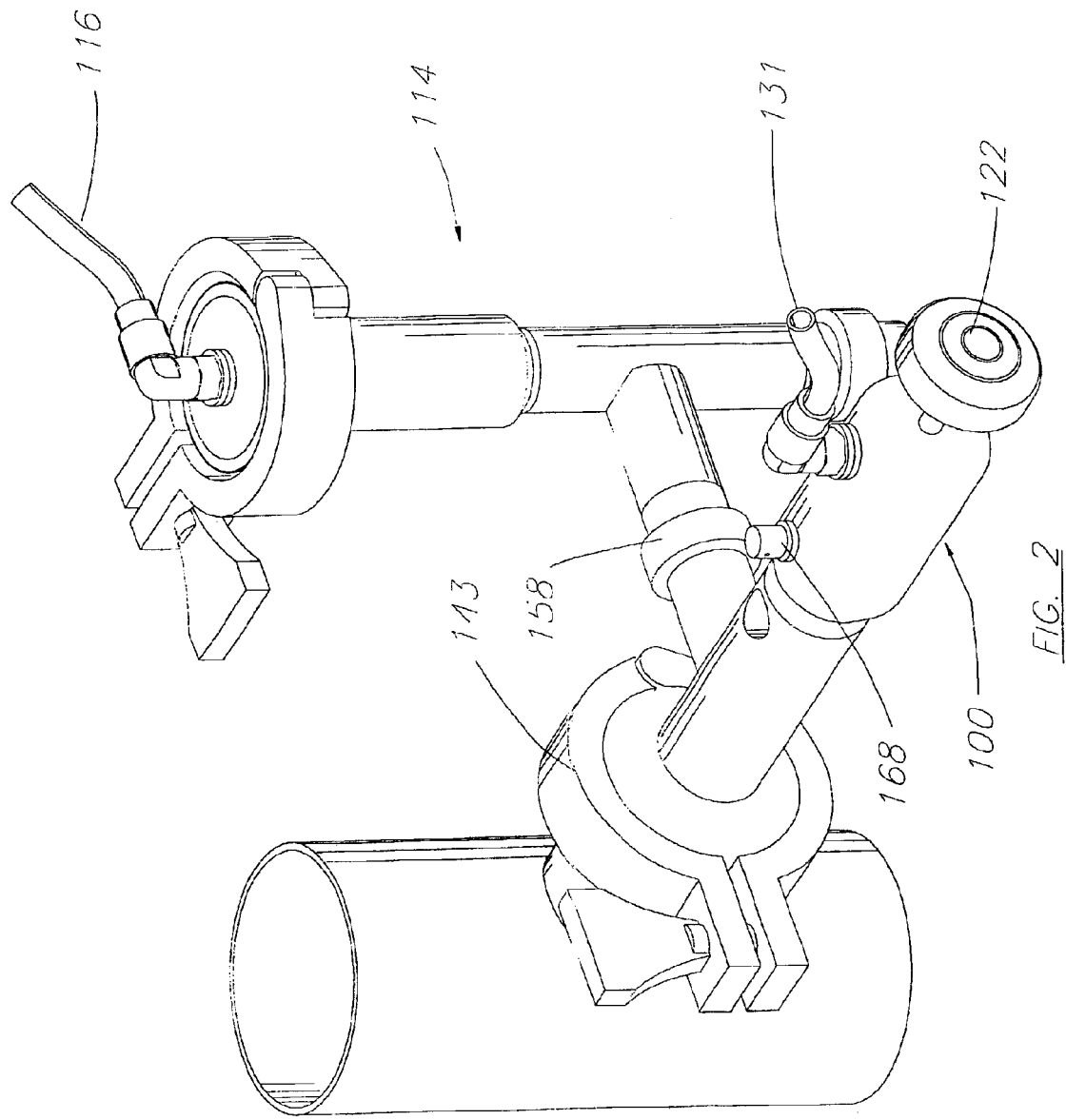
FIG. 2 is an isometric detailed view, on an enlarged scale relative to FIG. 1, of the clean-in-place air-blow valve of the present invention, shown operatively connected to a conventional shuttle valve.

To provide the illustrated tanks 102 and 104 with clean-in-place (CIP) capability, as was mentioned above, the air-blow valve 100 is preferably operatively coupled to a shuttle valve 114, as is shown in FIG. 2. The shuttle valve 114 is preferably connected to a source (not shown) of pressurized air via a conduit 116.

After completing a transfer of liquid material from the first tank 102 to the next tank 104, an outlet valve 118 of the first tank 102 is closed and the pump 108 is shut off. At this point, any liquid remaining in the line 106 is transferred into the next tank 104. This is accomplished by injecting pressurized air via conduit 116 (FIG. 2) into the shuttle valve 114, operatively coupled to the air-blow valve 100. The pressurized air then passes through the air-blow valve 100 and into the conduit 106 (FIG. 1). As a result, the pressurized air pushes the liquid through the conduit 106 and into the next tank 104.

For product-sample mode, a knob 122 is operably connected to the valve 100, so that when the knob 122 is depressed, product from the tanks 102 and 104 may be sampled into container 124 (FIG. 1). The air-blow valve 100 preferably includes a push knob 122 (FIG. 2), adapted for manual operation by plant personnel. When the knob 122 is pushed, a portion of the liquid contents of the tank 102 will flow freely out of the tank 102 and into a sample container 124 until the push knob 122 is released. To achieve such a result, the side-mounted air-blow valve 100 is preferably connected to the clean-in-place (CIP) solution source (not shown) via a coupling 126 and an auxiliary CIP solution conduit 128, both shown disconnected in FIG. 1. The second tank 104 is similarly equipped.

Thus, whether in "sample" or CIP mode, the illustrated air-blow valve 100 is itself cleaned-in-place along with associated tanks and connecting conduits.

Reference is next invited to FIGS. 3–10, so that the clean-in-place air-blow valve 100 of the present invention may be discussed in detail. The illustrated clean-in-place air-blow valve 100 is preferably used in combination with a conventional shuttle valve 114 having a movable shuttle valve element 130.

The clean-in-place (CIP) air-blow valve 100 of the present invention comprises a hollow valve body 132 (FIGS. 3–8), valve components, and first interchangeable conduit 131, second interchangeable conduit 168 and third conduit 133. The hollow valve body 132 defines an internal chamber 134 (FIGS. 9 and 10) presenting an inner surface 136, an internal shoulder 138 (FIG. 9), an internal valve seat 140 (FIG. 10), and an internal fluid passageway 142. The internal chamber 134 is preferably cylindrical, and the internal shoulder 138 is preferably annular.

The above-mentioned valve components, which are disposed within the valve body 132, include a piston 144 (FIGS. 9 and 10), a biasing element such as a spring 146, and a valve plug 148. The piston 144 is disposed within the chamber 134.

The valve components further preferably include an elongated valve stem 145 disposed within the valve body 132 and having opposite end portions, wherein the push knob 122 is removably affixed to one end portion of the stem 145, wherein the piston 144 is releasably affixed via a threaded connector 147 (FIGS. 9 and 10) adjacent to the one end portion of the stem 145, and wherein the plug 148 is mounted on the opposite end of the stem 145. The plug 148 is preferably removably mounted on stem 145 along end portion 184, shown as dashed line in FIGS. 9 and 10. The spring 146, disposed between the end portions of the valve stem 145, is preferably helical and captively retained in the valve body 132 by the valve stem 145.

In the valve body 132, the piston 144 is adapted and dimensioned relative to the inner surface 136 of the chamber 134 to be slidably engageable in a fluid-tight manner between first and second positions therewithin. In the first position (FIG. 9), the piston 144 is spaced from an internal stop 150 and the valve plug 148 abuttingly engages the valve seat 140. The preferred embodiment of the valve plug 148, itself, has a vulcanized-rubber coating 148A on the exterior of the valve plug 148 up to the dashed line 184 (FIGS. 9 and 10) between the valve stem 145 and the valve plug 148, to provide a vulcanized rubber fluid-tight seal along the valve seat 140.

In the second position (FIG. 10), the valve plug 148 is spaced from the valve seat 140 and the piston 144 abuttingly engages the internal stop 150. The first interchangeable conduit 131, in fluid communication with a pressurized-air source (not shown) is operatively connected to the valve body 132 via a conventional threaded nipple 135 (FIGS. 3–10), for providing pressurized air to the chamber 134 (FIGS. 9 and 10) for urging the piston 144 into the second position.

The first interchangeable conduit 131 and second interchangeable conduit 168 are positionally interchangeable (FIGS. 3–10). When configured to act as an air-blow valve (FIGS. 3–10) the first interchangeable conduit 131 is in fluid communication with the hindmost portion 153 of the internal chamber 134.

Figure 11:
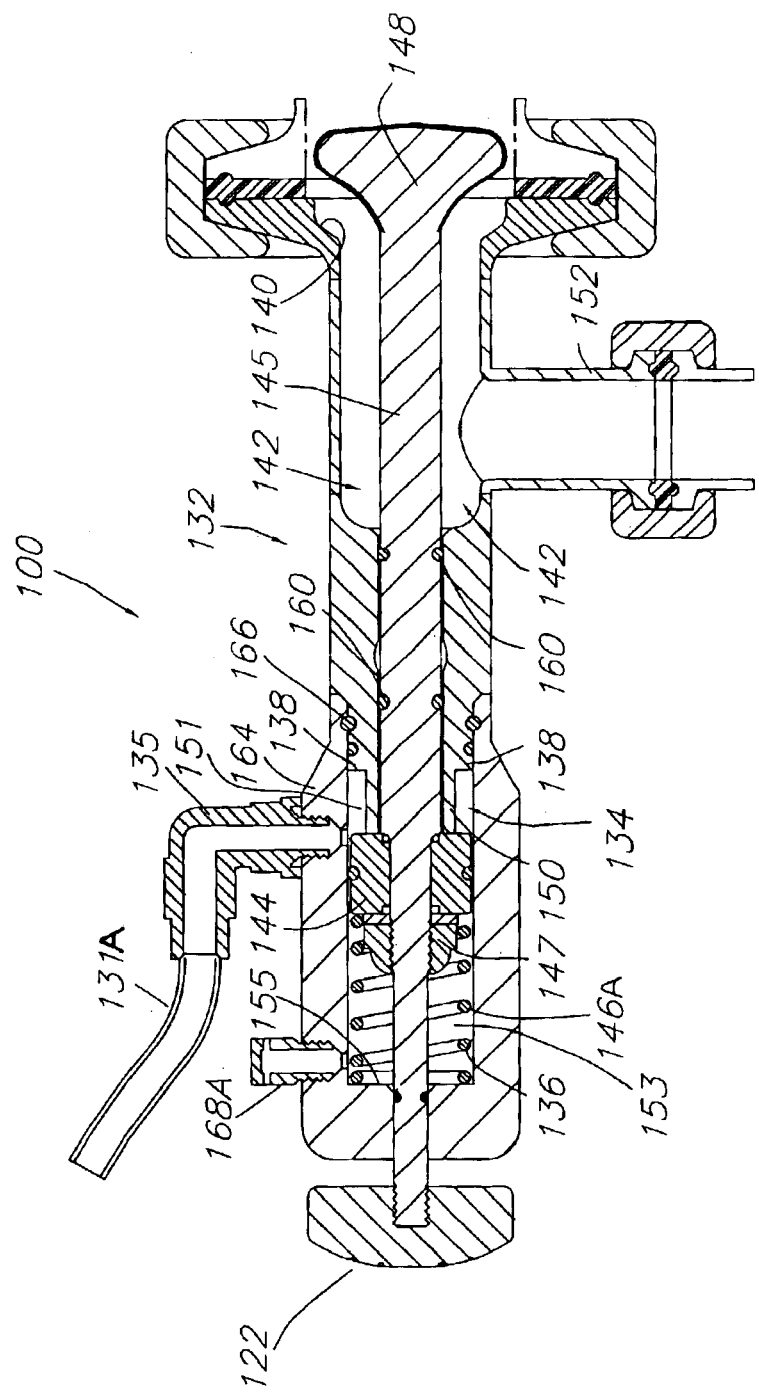
FIG. 11 is a cross-sectional view of a second embodiment of the air blow valve that is open and configured for drainage valve capacity.
Figure 13:
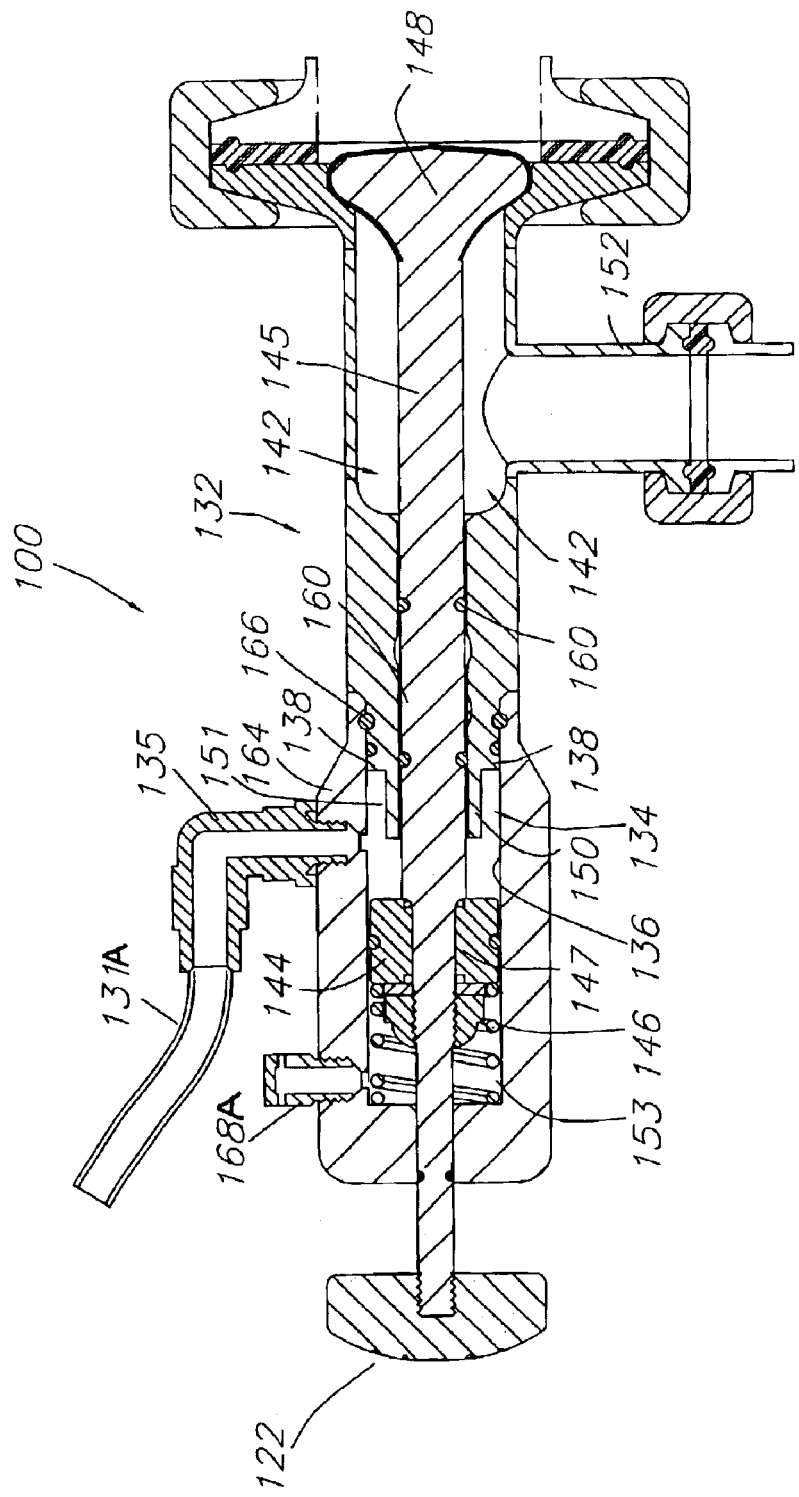
FIG. 13 is a cross-sectional view of the second embodiment of the air blow valve configured for drainage valve capacity, that is closed.

A second embodiment of the valve 100 is shown in FIGS. 11 and 13. When configured to act as a drainage valve (FIGS. 11 and 13), the first interchangeable conduit 131A is in fluid communication with the foremost portion 151 of the internal chamber 134. The second interchangeable conduit 168A may act as an exhaust port or alternatively be in fluid communication with a pressurized gas source (not shown).

Figure 9:
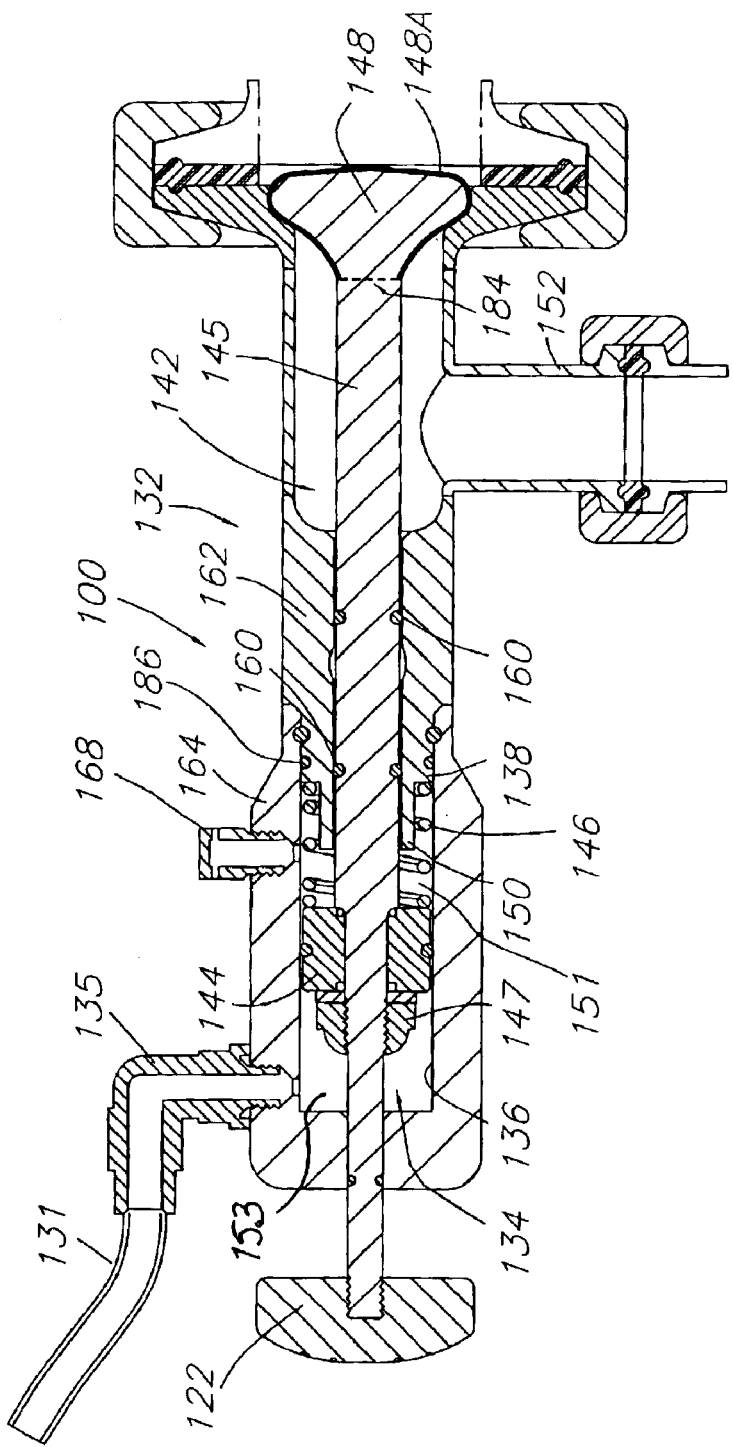
FIG. 9 is a cross-sectional view, on an enlarged scale relative to FIG. 3, and with structure behind the planes 9—9 removed.

When configured to function as an air-blow valve (FIGS. 3–10), a spring 146 is positioned in the foremost portion 151 of the internal chamber 142. The spring 146 abuttingly engages the piston 144 and the shoulder 138, for urging the piston 144 into the first position. The valve plug 148 is operatively connected to the piston 144, as is described above. The valve plug 148 is configured to engage the valve seat 140 (FIG. 10) in a fluid-tight relationship (FIG. 9) when the piston 144 is in the first position and to permit fluid to flow between the valve plug 148 and the valve seat 140 (FIG. 10) when the piston 144 is in the second position. While in this configuration the default position of the piston 144 is in the first position (FIG. 9).

When configured to function as a drainage valve (FIGS. 11 and 13) a spring 146A is positioned in the hindmost portion 153 of the internal chamber 134. The spring 146 abuttingly engages the piston 144 and a rear wall 155 of the internal chamber 134. In this configuration the default position of the piston 144 is in the second position (FIG. 11).

The fluid passageway 142 is preferably cylindrical, and the valve seat 140 is preferably "quasi frusto-conical" in shape. This means that the valve seat 140 resembles a frustum in that the valve seat 140, in sectional view, is seen to include the basal part of a cone-like shape formed by cutting-off the top (of the cone-like shape) via a plane parallel to the base. The preferred valve seat 140 is thus "quasi" frusto-conical in shape, for the reason that the valve seat 140, in the illustrated embodiments, is configured to engage the valve plug 148 in a fluid-tight relationship, when the piston 144 is in the first position and the valve plug 148 is operatively connected to the piston 144.

The third conduit 133 and the valve body 132 each preferably include flanged ends 137 and 139, enabling a conventional fluid-tight and leak-proof gasket 141 to be disposed therebetween. A conventional annular clamp 143 is circumferentially mounted on the flanged ends 137 and 139 of the valve body 132 and conduit 133, for holding the valve body 132 and conduit 133 together in a fluid-tight manner.

The third conduit 133 is in fluid communication with a sanitizing-fluid source (not shown) via a transfer line 149. (The third conduit 133 and the transfer line 149 are shown in phantom line in (FIGS. 3–8.) The third conduit 133 is operatively connected to the valve body 132, to provide a sanitizing clean-in-place (CIP) fluid into a portion of the valve body 132, for sanitizing the valve seat 140, the plug 148, a portion of the valve stem 145 connected to the plug 148, and the internal fluid passageway 142.

A fourth conduit 152 (FIGS. 3–8) may operatively be connected to the valve body 132 for the purpose of joining the shuttle valve 114 to the air-blow valve 100, preferably by integrally joining the fourth conduit 152 to the valve body 132. The fourth conduit 152 is also operatively coupled to the shuttle valve 114 via a fifth conduit 154 which is preferably integrally joined to the shuttle valve 114. The fourth and fifth conduits 152 and 154 preferably include flanged end connections 157 and 159, enabling a conventional fluid-tight and leak-proof gasket 156 to be disposed therebetween. A conventional annular clamp 158 is circumferentially mounted on the flanged ends 157 and 159 of the conduits 152 and 154, for holding the conduits 152 and 154 together in a fluid-tight manner. The fourth conduit 152 is in fluid communication with a pressurized-air source (not shown) via the shuttle valve 114. The shuttle valve element 130 is movable between first (FIGS. 3, 7 and 8) and second (FIGS. 5 and 6) positions for providing pressurized air to the internal fluid passageway 142 (FIG. 10) for urging the valve plug 148 away from the valve seat 140.

For the air-blow valve 100, optional components or elements include O-rings 160 (FIGS. 9 and 10) circumferentially mounted in external grooves of the elongated valve stem 145. For the air-blow valve 100, the hollow valve body 132 may include two body portions 162 and 164 defining an interfit connection along the interfitting surface portions (FIGS. 9 and 10) thereof, wherein the interfitted body portions are detachably joined in an air-tight and fluid-tight manner. An annular retaining ring 166, commercially available and made of metal, is preferably used in a conventional manner to hold the body portions 162 and 164 together. Another O-ring 186 is preferably included between the body portions 162 and 164 of the valve body 132 adjacent the retaining ring 166. Conduit 168 in the preferred embodiment is a conventional T-shaped air-exhaust port (shown in cross section in FIGS. 9 and 10) and positioned on the side of body portion 164 in fluid communication with the foremost portion 151 of the internal chamber 134, in order to provide a path for air to exhaust from the chamber 134 when the piston 144 moves within the chamber 134, enabling the piston 144 to engage the stop 150.

In the second embodiment, conduit 168A acting as an exhaust port may alternatively be positioned in fluid communication with the hindmost portion 153 of the internal chamber 134 (FIGS. 11 and 13).

Figure 3:
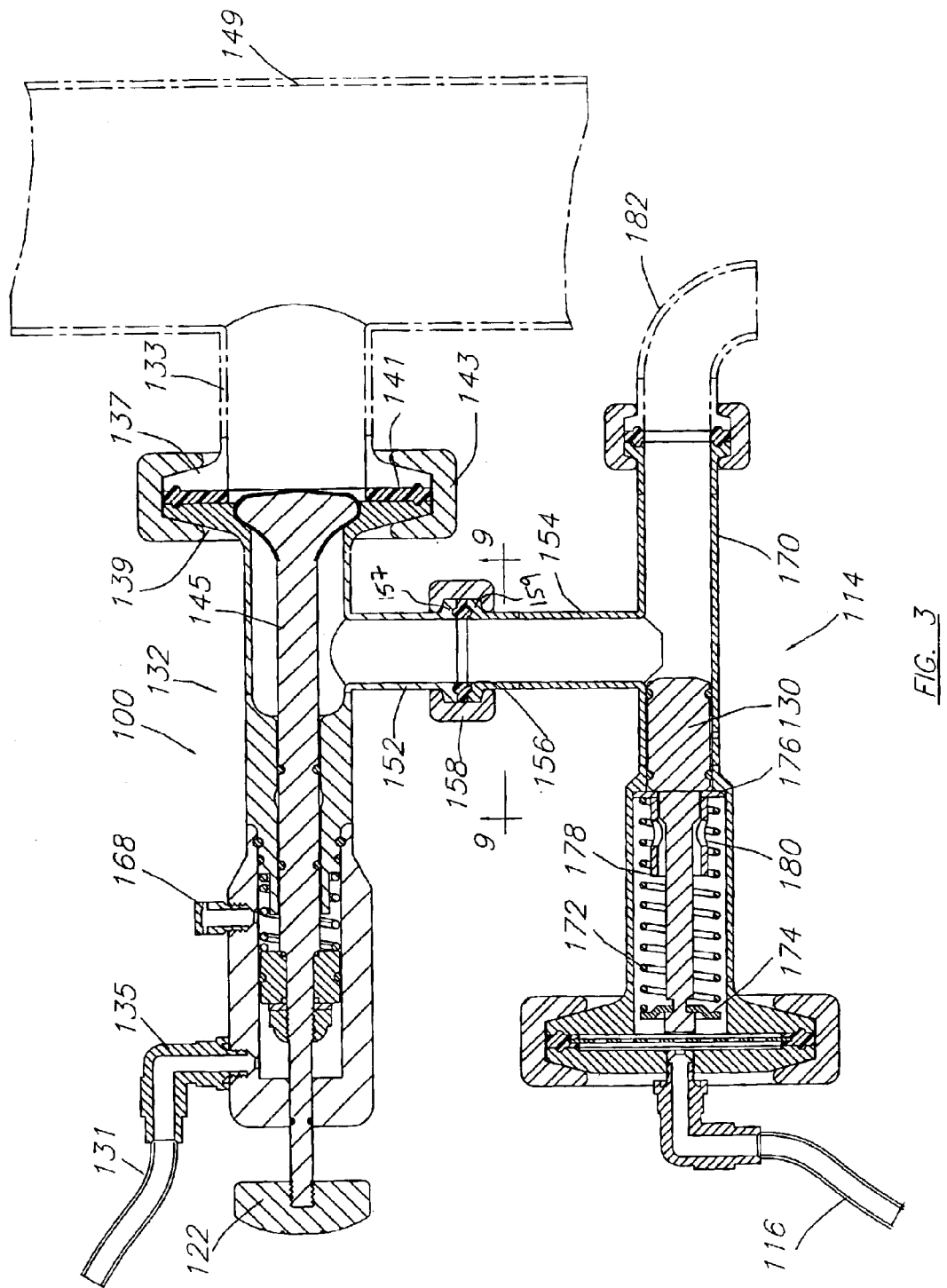
FIGS. 3–8 are a series of sequential cross-sectional views, all of which are presented on an enlarged scale relative to FIG. 1, of the clean-in-place air-blow valve of the present invention, shown operatively connected to the shuttle valve.

Additional optional elements or components shall now be discussed. The shuttle valve 114 includes an elongated hollow valve body 170 in which the moveable shuttle valve element 130 is longitudinally slideably engageable. A portion of the moveable shuttle valve element 130 is disposed through a helical spring 172. An end portion of the shuttle valve element 130 carries a retaining clip 174. Opposed ends of the helical spring 172 engage an inner shoulder 176 and the retaining clip 174 (FIG. 3). Movement of the shuttle valve element 130 ceases when retaining clip 174 engages an internal stop 178. Internal openings 180 permit pressurized air entering the shuttle valve 114 via the conduit 116 to enter the fluid passageway 142 via the conduits 152 and 154 when the shuttle valve element 130 is fully extended (FIGS. 5 and 6) by pressurized air. The shuttle valve 114 includes a drainage outlet 182 (shown in phantom line) for drainage purposes.

Figure 4:
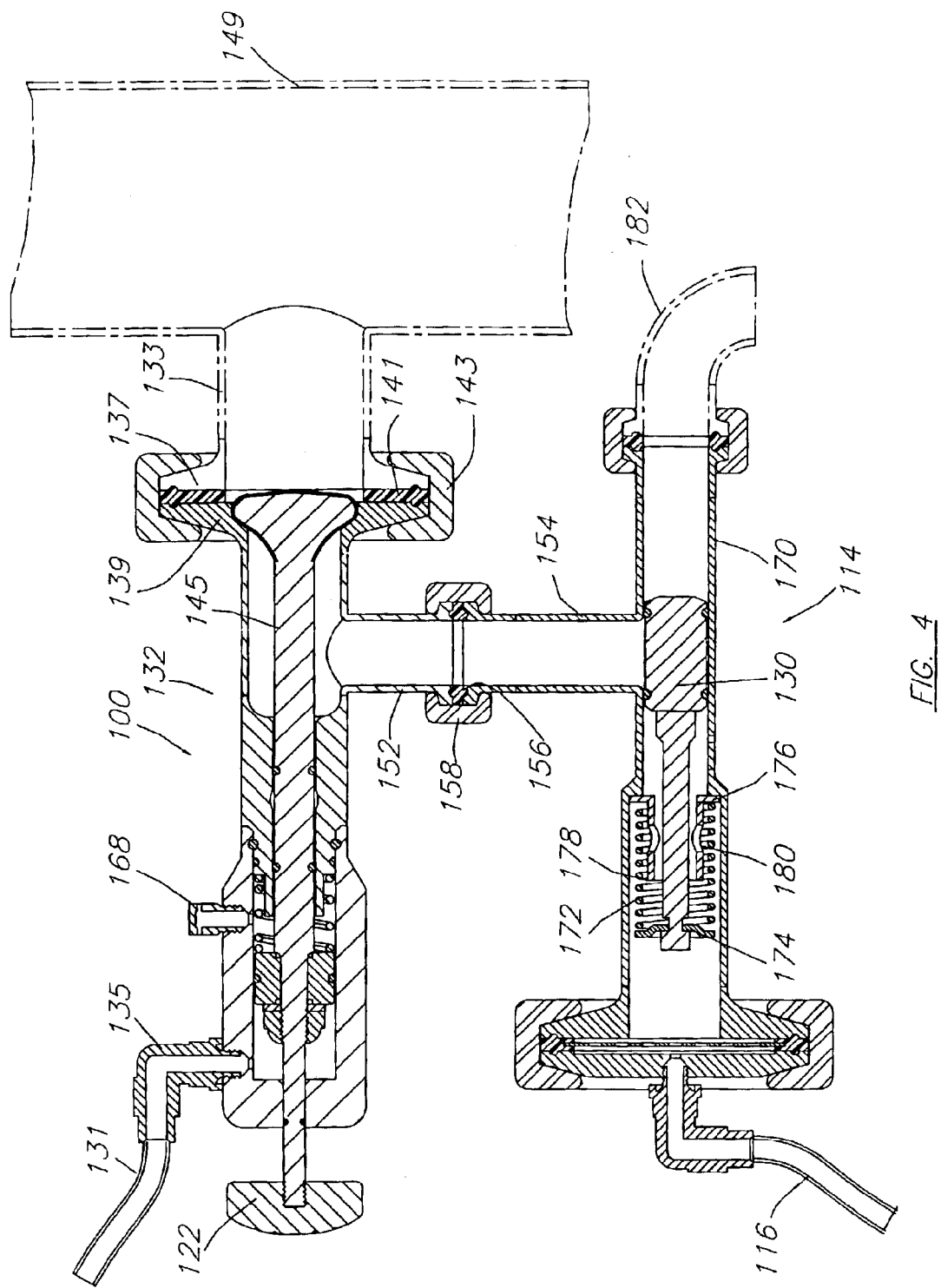
Figure 5:
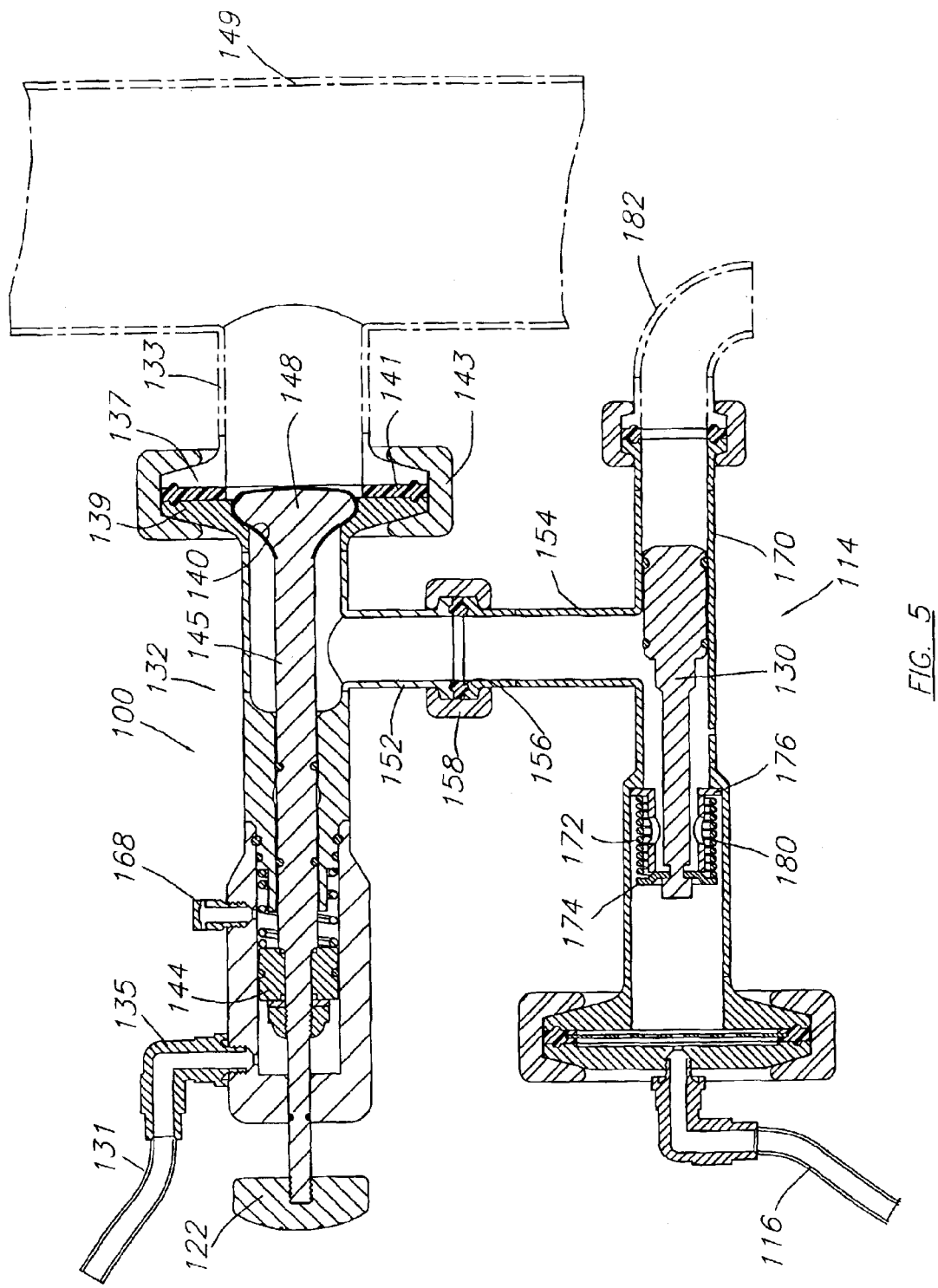

The air-blow function of the present invention shall now be summarized. To begin the air-blow function, pressurized air is introduced via the conduit 116 into the body 170 of the shuttle valve 114, causing the valve element 130 to move to the right (FIGS. 3–5). Prior to movement of the valve element 130, note that the valve plug 148 of the air-blow valve 100 is seated, and that product is flowing in the transfer line 149. As the valve element 130 moves, the spring 172 of the shuttle valve 114 is compressed. (Compare FIGS. 3 and 5.) The valve element 130 moves to the right until the retaining clip 174 engages the internal stop 178, at which time the outlet 182 of the shuttle valve 114 is sealed off (FIG. 5), and pressurized air enters the internal fluid passageway 142 of the air-blow valve 100 (FIG. 9) via the internal openings 180 of the shuttle valve 114 and the conduits 152 and 156 (FIG. 5) connecting the shuttle valve 114 to the air-blow valve 100.

Figure 6:
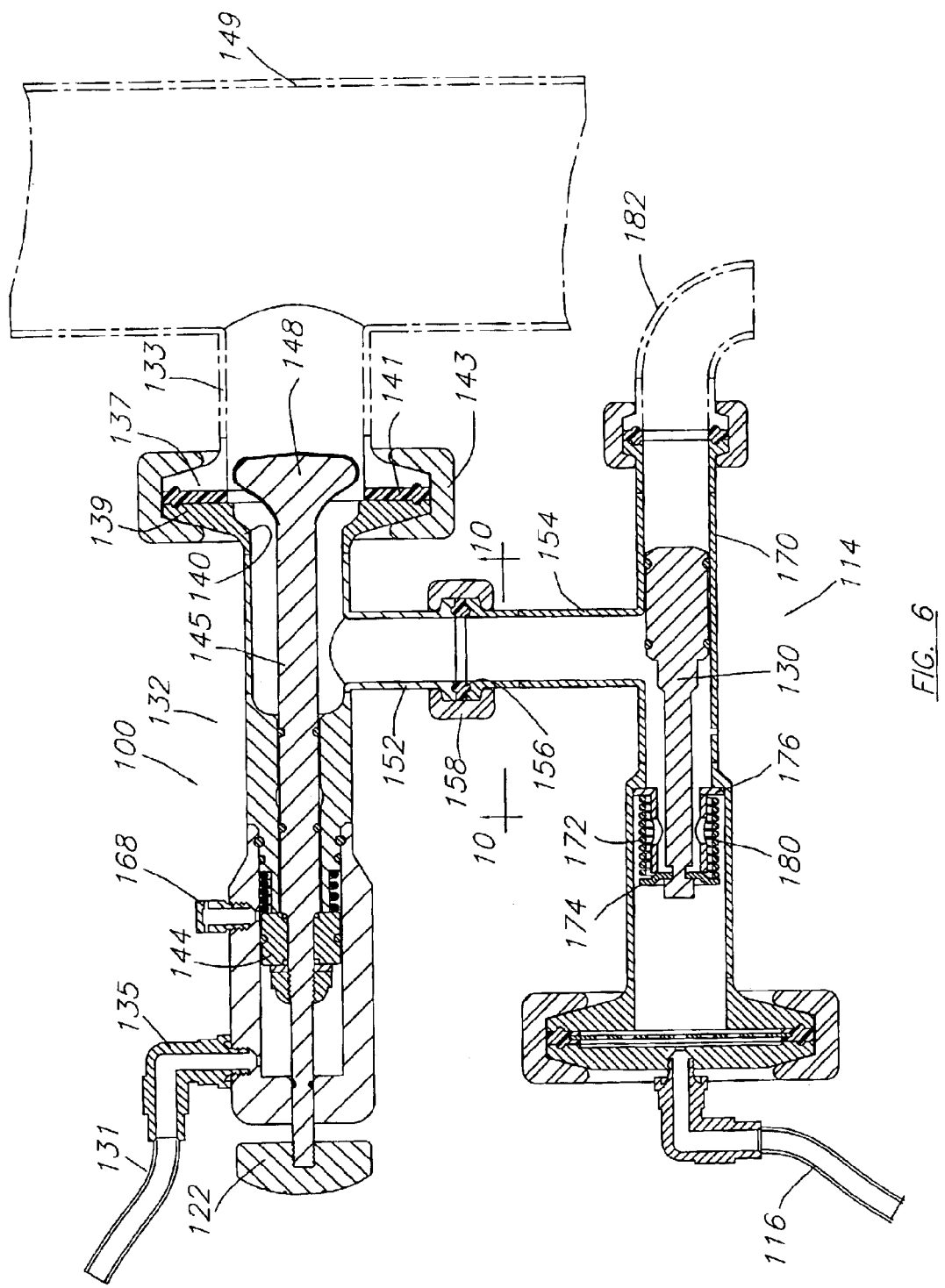
Figure 7:
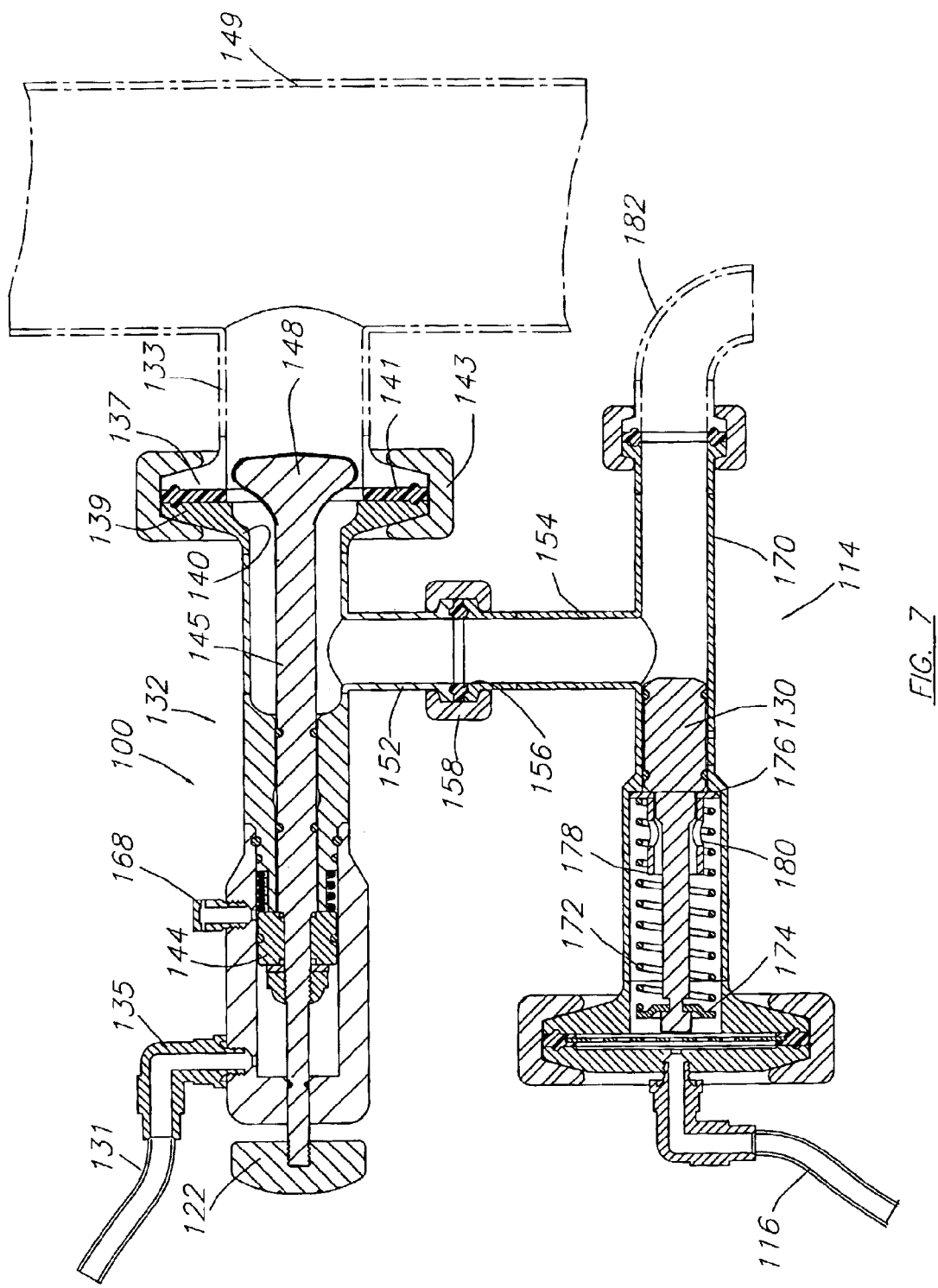
Figure 8:
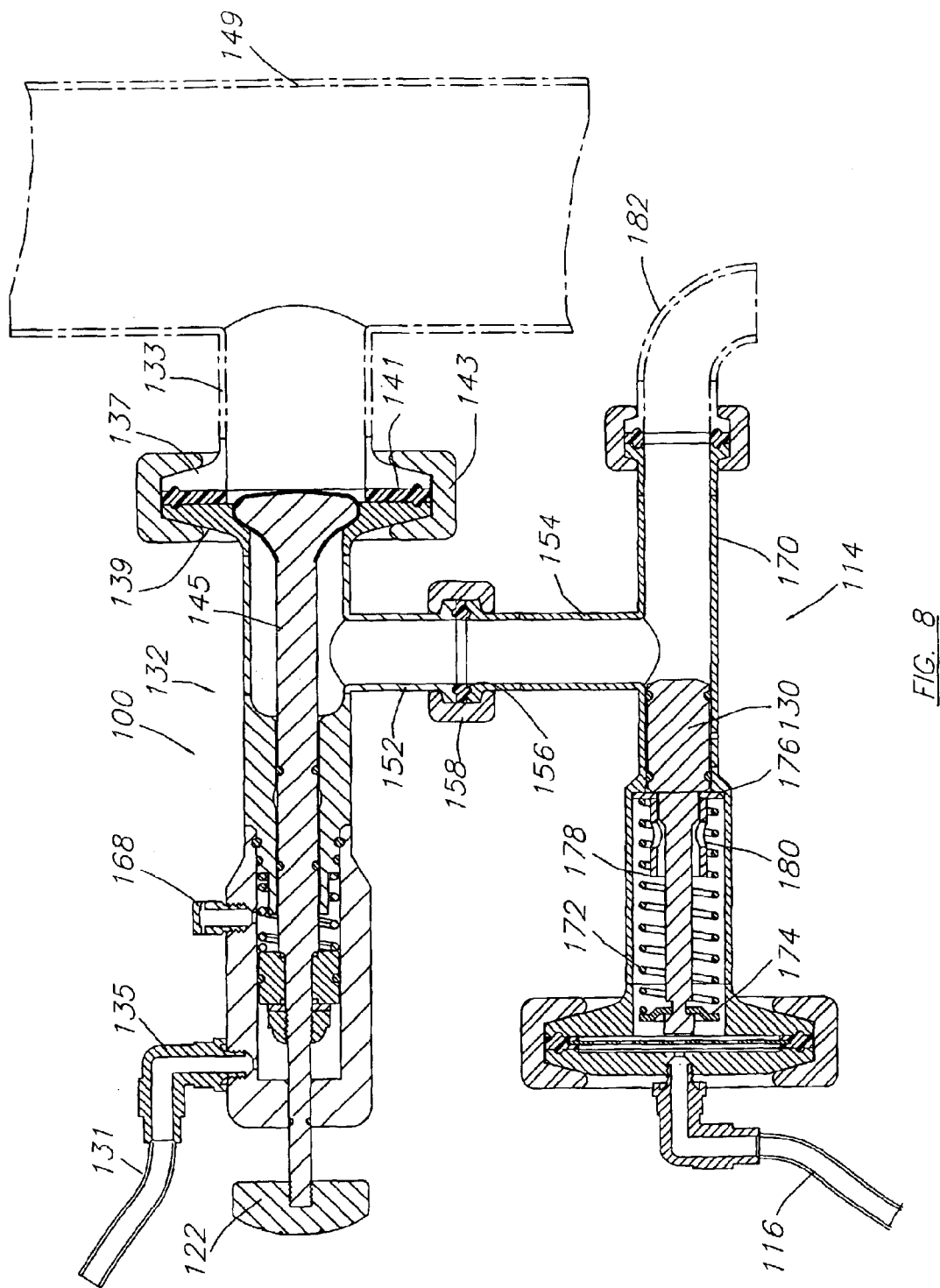
Figure 10:
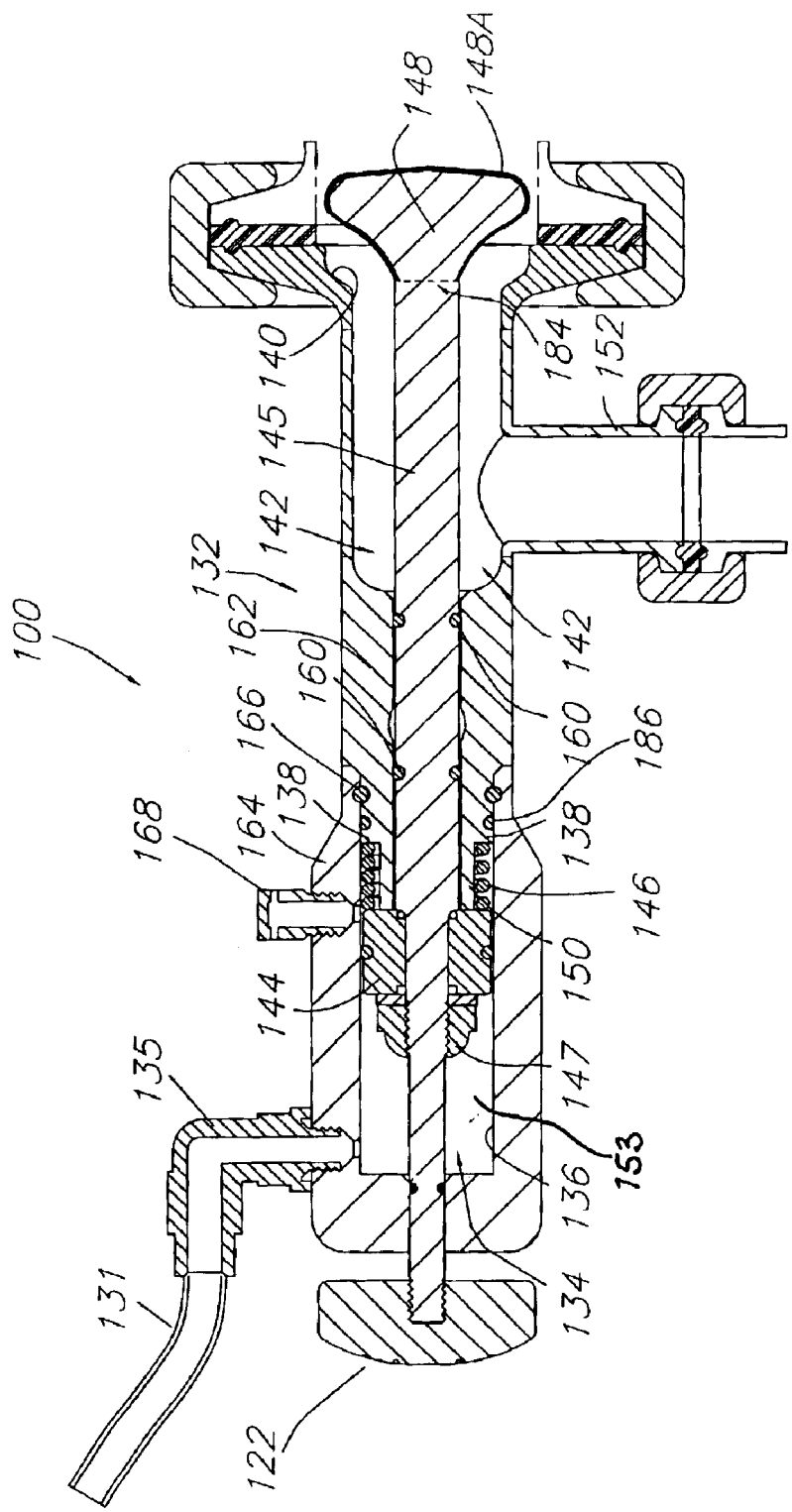
FIG. 10 is a cross-sectional view, on an enlarged scale relative to FIG. 6, and with structure behind the planes 10—10 removed.

Pressurized air in the internal fluid passageway 142 of the air-blow valve 100 causes the valve plug 148 to become spaced from the valve seat 140 (FIGS. 6 and 10), exhausting the pressurized air into the transfer line 149 (FIG. 6). Unseating the valve plug 148 (within the air-blow valve body 132) in this manner (FIG. 10) thus causes the piston 144 to compress the spring 146 within the air-blow valve 100 (FIGS. 6 and 10).

When pressurized air to the shuttle valve 114 ceases (FIGS. 3, 6 and 7), the valve element 130 is moved to the left (FIGS. 7 and 8) by the force of the compressed helical spring 172 (FIGS. 5 and 6). Just prior to cessation of the pressurized air to conduit 116, note that the valve plug 148 is seated (FIG. 6), and that immediately after cessation of the pressurized air into the internal chamber 142 of the air-blow valve 100 that the compressed spring 146 causes the valve plug 148 to seat (FIGS. 5 and 9) in the air-blow valve 100. At such time, within the air-blow valve 100, the valve plug 148, the valve stem 145, and the piston 144 return to their "normal" positions (FIG. 8), which is caused by the spring 146 urging the piston 144 and the shoulder 138 apart (FIG. 9).

At this time, there will be product residue and air, from the air-blow valve 100, within the conduit 133 and the transfer line 149. (FIG. 3). Preferably, the product transfer line 149 has been isolated from its associated process (not shown) prior to this air-blow operation, and the transfer line 149 has been drained or at least partially emptied.

Just prior to CIP operations, note that the valve plug 148 is seated (FIG. 3), and that a conventional CIP sanitizing liquid is pumped through the product transfer line 149. During clean-in-place of the transfer line 149, there are certain times when it is desirable, within the air-blow valve 100, to unseat the valve plug 148 so that the pressurized CIP solution within the transfer line 149 forcefully floods the internal fluid passageway 142, a portion of the valve stem 145, and the valve plug 148, so as to clean and sanitize all of these wetted parts. (Compare FIGS. 3 and 7.) With valve plug 148 unseated (FIG. 7), the sanitizing fluid sanitizes the above-identified wetted parts, exits the air-blow valve 110, and passes through the shuttle valve 114 via the drainage outlet 182 to atmosphere.

The clean-in-place (CIP) capability of the air-blow valve 100 of the present invention shall now be summarized. To begin, pressurized air is introduced via conduit 131 into the internal chamber 134 body, causing the spring 146 to become compressed and spacing the valve plug 148 from the valve seat 140. (Compare FIGS. 9 and 10.) As the piston 144 moves within the internal chamber 134, pressurized air is vented to atmosphere via the air exhaust port 168. When the helical spring 146 is fully compressed (FIG. 10), the valve plug 148 is spaced from the valve seat 140. Then pressurized CIP liquid is forced from transfer line 149 into the internal chamber 142, cleaning the seat 140, internal chamber 142, plug 148 and stem 145, and is discharged via outlet 182, as described above. To stop CIP procedures, the pressurized air supplied via conduit 131 ceases, pressurized air is vented from the chamber 134 via the air exhaust port 168, and the compressed spring 146 (FIG. 10) moves the piston 144 to the left (FIG. 9) until the plug 148 is seated, which ends the flow of CIP liquid into air-blow valve 100.

Note that the shuttle valve 114, since it is operatively connected to the air-blow valve 100, is able to permit the discharge of materials that may have originated with either the transfer line 149 or the compressed air that was introduced into the air-blow valve 100 via the conduit 131. For example, during clean-in-place (CIP) sanitizing of the transfer line 149, the valve plug 148 of the air-blow valve 100 will be unseated for a period of time that may range between about one second up to several minutes, as desired, during which time the liquid CIP sanitizing fluid will have passed through the air-blow valve 100 as well as through the outlet 182 of shuttle valve 114.

In this way, the clean-in-place procedures set forth in this patent specification, which result from preferred operation of the air-blow valve of the present invention, are able to take place without the need to disconnect process equipment.

The "sample valve" feature of the invention, which enables sampling of fluid or product from a tank or process pipe into a sampling vessel, will now be summarized. If air-blow capability is required, the use of the air-blow valve 100 in conjunction with the shuttle valve 144 is suggested. Otherwise, only the air-blow valve 100 is suggested.

To begin sampling, the air-blow valve 100 includes the knob 122, permitting manual operation to compress the spring 146 and unseat (FIG. 10) the valve plug 148. Pressurized air within the chamber 134 is vented via the outlet 168. Releasing manual pressure on the knob 122 allows the compressed spring 146 to extend (FIG. 9) to seat the valve plug 148.

Preferably the valve plug 148 is in a seated position when the knob 122, is engaged so as to initiate the "sample valve" feature of the invention. The valve plug 148 need not be seated for the drainage valve capacity. Depending upon the desired use, the valve plug 148 may be seated or unseated when drainage valve capacity is desired. A programmable logic controller (PLC) (not shown) may be utilized to dynamically control the positioning of the valve plug 148. The PLC may additionally control the timing of the valve plug 148 positioning. A position detector (not shown) may be mounted to the valve stem 145 in order to communicate the position of the valve plug 148 to the PLC. Such a device may be in the form of a proximity switch or micro switch.

Figure 12:
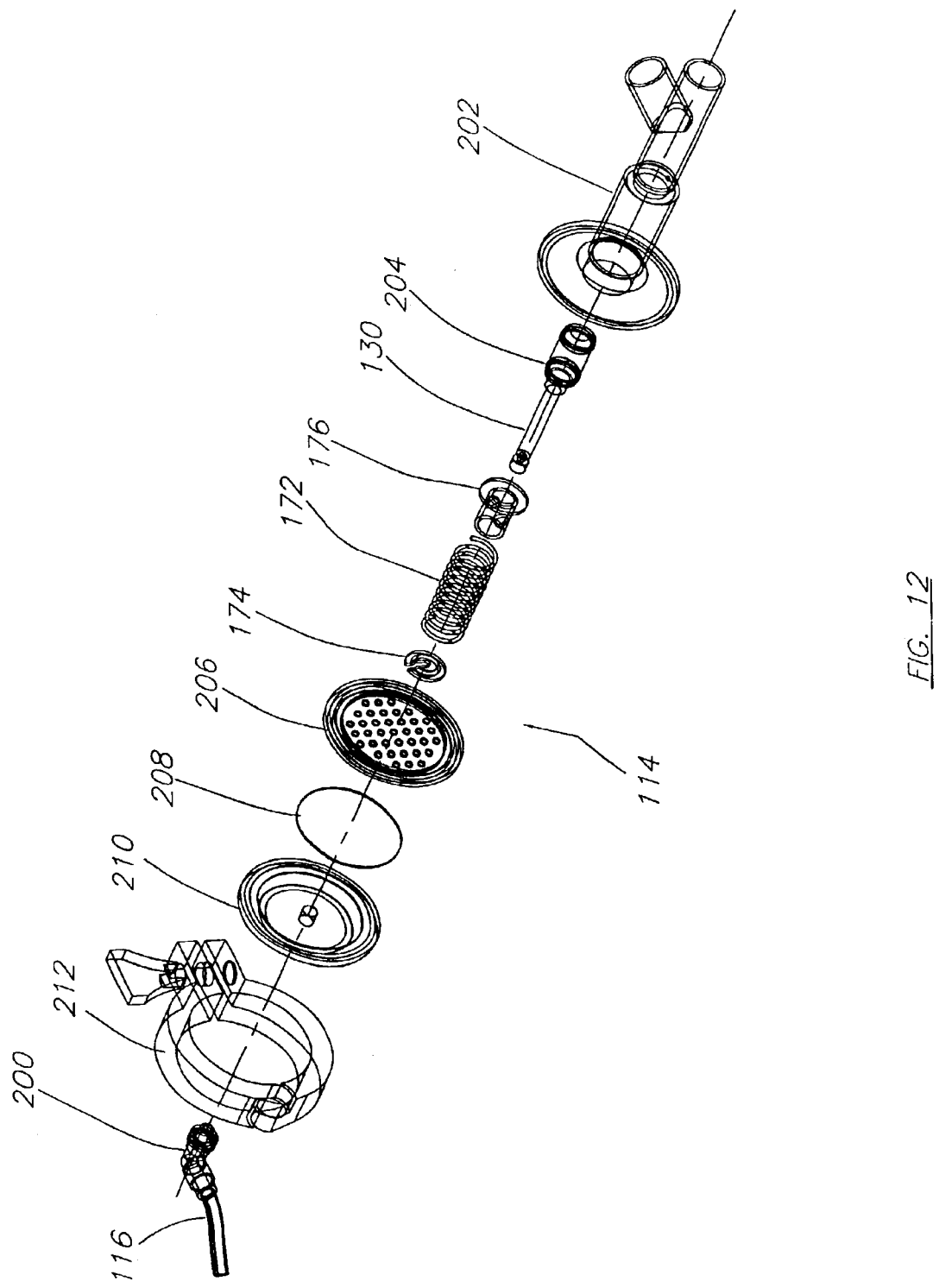
FIG. 12 is an exploded view of the preferred embodiment of the shuttle valve assembly.

The preferred embodiment of the shuttle valve assembly is illustrated in FIG. 12, wherein conduit 116 is fixedly attached to the shuttle valve via threaded nipple 200. A number of the shuttle valve elements are contained within and in close proximity to the shuttle valve body 202. These elements include a piston 130 containing O-rings 204, an inner shoulder 176, helical compression spring 172, retaining clip 174, perforated filter holder 206, filter media 208, and cap 210. The elements are held together with the shuttle valve body 202 by a clamp 212.

Alternatively, the first and second embodiments of the air-blow valve 100 may be utilized simultaneously in conjunction with a material transport facility. One of the valves may be configured to act in a drainage valve capacity, as shown in FIG. 11, the other configured to act in a air-blow valve capacity, as shown in FIG. 3. Both valves would be in fluid communication with the material transport facility.

What has been illustrated and described herein is an air-blow valve, designed and configured to have clean-in-place capabilities. However, as the air-blow valve has been illustrated and described with reference to preferred embodiments, it is to be understood that the invention is not to be limited to these embodiments. In particular, and as those skilled in the relevant art can appreciate, functional alternatives will become apparent after reviewing this patent specification. Accordingly, all such functional equivalents, alternatives, and/or modifications are to be considered as forming a part of the present invention insofar as they fall within the spirit and scope of the appended claims.

What is claimed is:

1. A valve configured for clean-in-place capability and reconfigurable as a air-blow valve or drainage valve, wherein the valve comprises:
   (A) a hollow valve body defining an internal chamber presenting an inner surface, an internal shoulder, an internal valve seat, and an internal fluid passageway;
   (B) valve components disposed within the hollow valve body and including:
      (1) a piston disposed within the internal chamber, wherein the piston is adapted and dimensioned relative to the inner surface as to be slidably engageable in a fluid-tight manner between first and second positions therewithin; and
      (2) a valve plug operatively connected to the piston, wherein the valve plug is configured (i) to engage the internal valve seat in a fluid-tight relationship when the piston is in the first position and (ii) to permit fluid to flow between the valve plug and the internal valve seat when the piston is in the second position;
   (C) a first interchangeable conduit and second interchangeable conduit, wherein at least one interchangeable conduit is in fluid communication with a pressurized-air source and operatively connected to the hollow valve body, for providing pressurized air to the internal chamber for urging the piston into the second position or the first position; and
   (D) a third conduit, in fluid communication with a sanitizing-fluid source and operatively connected to the hollow valve body, for providing a sanitizing fluid into a portion of the hollow valve body, for sanitizing the internal valve seat, the plug, and the internal fluid passageway.

2. The valve of claim 1, further comprising an elongated valve stem having first and second end portions, wherein said first end portion is coupled to said valve plug, and said second end portion extends outside of said hollow valve body.

3. The valve of claim 1, wherein the hollow valve body includes two body portions defining an interfit connection, wherein the interfitted body portions are detachably joined in an air-tight manner.

4. The valve of claim 3, wherein the internal valve seat is quasi frusto-conical.

5. The valve of claim 1, further comprising an elongated valve stem disposed within the hollow valve body and having opposite end portions, wherein the piston is releasably affixed adjacent to one end portion of the stem, and wherein the valve plug is mounted on the opposite end of the elongated valve stem.

6. The valve of claim 1, wherein the internal chamber is cylindrical.

7. The valve of claim 1, wherein the internal fluid passageway is cylindrical.

8. The valve of claim 1 wherein at least one of said first and second interchangeable conduits is operatively acting as a fluid exhaust port, releasing fluid from said internal chamber to an outside atmosphere.

9. The valve of claim 1 wherein the first interchangeable conduit or the second interchangeable conduit are in fluid communication with a pressurized-air source and operatively connected to the hollow valve body, for providing pressurized air to the internal chamber for urging the piston into the second position or the first position.

10. The valve of claim 1 wherein the valve components disposed within the hollow valve body further comprise a spring, wherein the spring is captively retained within the valve body, said spring may be situated in a first or second setting, said first setting being abuttingly engaged with said piston and said shoulder in a foremost portion of said internal chamber, for urging said piston into said first position, so as to operate in an air-blow valve capacity; and said second setting being abuttingly engaged with said piston and a rear wall of a hindmost portion of said internal chamber, so as to operate in a drainage valve capacity.

11. The valve of claim 10, wherein the internal shoulder is annular.

12. The valve of claim 10, wherein the spring is helical and captively retained in the valve body by the elongated valve stem, and wherein the helical spring is disposed between the valve stem end portions.

13. In combination with a material-transport facility having a material-transport conduit, a valve configured for clean-in-place capability, wherein the valve comprises:
   (A) a hollow valve body defining an internal chamber presenting an inner surface, an internal shoulder, an internal valve seat, and an internal fluid passageway;
   (B) valve components disposed within the valve body and including
      (1) a piston disposed within the chamber, wherein the piston is adapted and dimensioned relative to the inner surface as to be slidably engageable in a fluid-tight manner between first and second positions therewithin; and
      (2) a valve plug operatively connected to the piston, wherein the valve plug is configured (i) to engage the valve seat in a fluid-tight relationship when the piston is in the first position and (ii) to permit fluid to flow between the valve plug and the valve seat when the piston is in the second position;
   (C) a first interchangeable conduit and second interchangeable conduit, wherein at least one interchangeable conduit is in fluid communication with a pressurized-air source and operatively connected to the valve body, for providing pressurized air to the chamber for urging the piston into the second position or the first position; and
   (D) a third conduit, in fluid communication with a sanitizing-fluid source and operatively connected to the valve body, for providing a sanitizing fluid into a portion of the valve body, for sanitizing the valve seat, the plug, and the internal fluid passageway;
wherein the valve is in fluid communication with the material-transport facility via the material-transport conduit.

14. The valve of claim 13, wherein said elongated valve stem is arranged for manual operation to cause the valve plug to become spaced from the elongated valve stem.

15. The valve of claim 14, further comprising a fourth conduit.

16. The valve of claim 15, wherein the fourth conduit is operatively connected to a shuttle valve.

17. In combination with a shuttle valve having a moveable shuttle valve element, an air-blow valve configured for clean-in-place capability, wherein the air-blow valve comprises:
(A) a hollow valve body defining an internal chamber presenting an inner surface, an internal shoulder, an internal valve seat, and an internal fluid passageway;
(B) valve components disposed within the hollow valve body and including:
  (1) a piston disposed within the internal chamber, wherein the piston is adapted and dimensioned relative to the inner surface as to be slidably engageable in a fluid-tight manner between first and second positions therewithin;
  (2) a spring, captively retained within the hollow valve body; and
  (3) a valve plug operatively connected to the piston, wherein the valve plug is configured (i) to engage the internal valve seat in a fluid-tight relationship when the piston is in the first position and (ii) to permit fluid to flow between the valve plug and the internal valve seat when the piston is in the second position;
(C) a first conduit, in fluid communication with a first pressurized-air source and operatively connected to the hollow valve body, for providing pressurized air to the internal chamber for urging the piston into the second position;
(D) a second conduit, in fluid communication with a sanitizing-fluid source and operatively connected to the hollow valve body, for providing a sanitizing fluid into a portion of the hollow valve body, for sanitizing the internal valve seat, the plug, and the internal fluid passageway; and
(E) a third conduit, in fluid communication with the internal fluid passageway and a second pressurized air source and operatively coupled to a shuttle valve, wherein a shuttle valve element is movable between first and second positions for providing pressurized air to the fluid passageway to cause the valve plug to become spaced from the internal valve seat;

wherein the shuttle valve further comprises;

a means for connecting a pressurized air source;

a filter media, designed for filtering the source of pressurized air; and a compression spring.

18. The air blow valve and shuttle valve combination of claim 17, wherein said combination is in fluid communication with a material transport facility; said material transport facility is in fluid communication with a second air blow valve acting in the capacity of a drainage valve.

19. The air-blow valve of claim 17, wherein said spring may be situated in a first or second setting, said first setting being abuttingly engaged with said piston and said internal shoulder in a foremost portion of said internal chamber, for urging said piston into said first position, so as to operate in an air-blow valve capacity, and said second setting being abuttingly engaged with said piston and a rear wall of a hindmost portion of said internal chamber, so as to operate in a drainage valve capacity.

* * * * *